United States Patent [19]

Williams

[11] Patent Number: 4,775,999
[45] Date of Patent: Oct. 4, 1988

[54] REGISTRATION OF RADIOTELEPHONES IN NETWORKED CELLULAR RADIOTELEPHONE SYSTEMS

[75] Inventor: James M. Williams, Lombard, Ill.

[73] Assignee: Motorola, Inc., Schaumburg, Ill.

[21] Appl. No.: 131,297

[22] Filed: Dec. 7, 1987

Related U.S. Application Data

[63] Continuation of Ser. No. 37,268, Apr. 10, 1987, abandoned, which is a continuation-in-part of Ser. No. 925,427, Oct. 31, 1986, Pat. No. 4,737,978.

[51] Int. Cl.$^4$ .............................................. H01Q 7/04
[52] U.S. Cl. ....................................... 379/59; 379/57; 455/33; 340/825.44
[58] Field of Search ............................ 379/57, 59, 60; 340/825.44; 455/33, 34, 54

[56] References Cited

U.S. PATENT DOCUMENTS

| | | | |
|---|---|---|---|
| 4,233,473 | 11/1980 | Frost | 379/59 |
| 4,562,572 | 12/1985 | Goldman et al. | 379/60 |
| 4,658,416 | 4/1987 | Tanaka | 379/57 |
| 4,737,978 | 4/1988 | Burke et al. | 379/60 |

FOREIGN PATENT DOCUMENTS 60-38948  2/1985  Japan ..................................... 455/54

OTHER PUBLICATIONS

Cuevgniet et al, "Radiocom 2000", *Commutation & Transmission*, No. 2, 1985, pp. 39–50.

Hamada et al, "Maritime Mobile Telephone Switching Programs", *Review of Electrical Communications Laboratories*, vol. 24, Nos. 11–12, Nov.–Dec. 1976.

*Primary Examiner*—Robert Lev
*Attorney, Agent, or Firm*—Rolland R. Hackbart

[57] ABSTRACT

Adjacent cellular systems (101–103) are interconnected to form a network providing telephone coverage to mobiles located throughout their combined coverage areas (111–113). Each networked cellular system (101–103) includes base sites (412, 414, 416) located in cells (402, 404, 406) and a control terminal (420) coupled by data and voice lines to the base sites, a telephone central office (422) and the other cellular systems. Each base site (412, 414, 416) includes a base site controller 950, a scanning receiver 910, signalling transceiver 912 and up to eight voice channel transceivers (901–908). As mobiles move about the networked coverage area (111–113), intrasystem handoffs are provided between cells of the same cellular system, and intersystem handoffs are provided between border cells of adjacent cellular systems. Mobiles are paged throughout the networked coverage area (111–113) in the paging area (121–136) in which the mobile last registered. Registration parameters are updated by the control terminal (420) and base sites (412, 414, 416) and sent to mobiles in the overhead message train. Mobiles automatically register in response to receipt of the overhead message train when moving between paging areas (121–136) according to the flow charts of FIGS. 5 and 6.

7 Claims, 13 Drawing Sheets

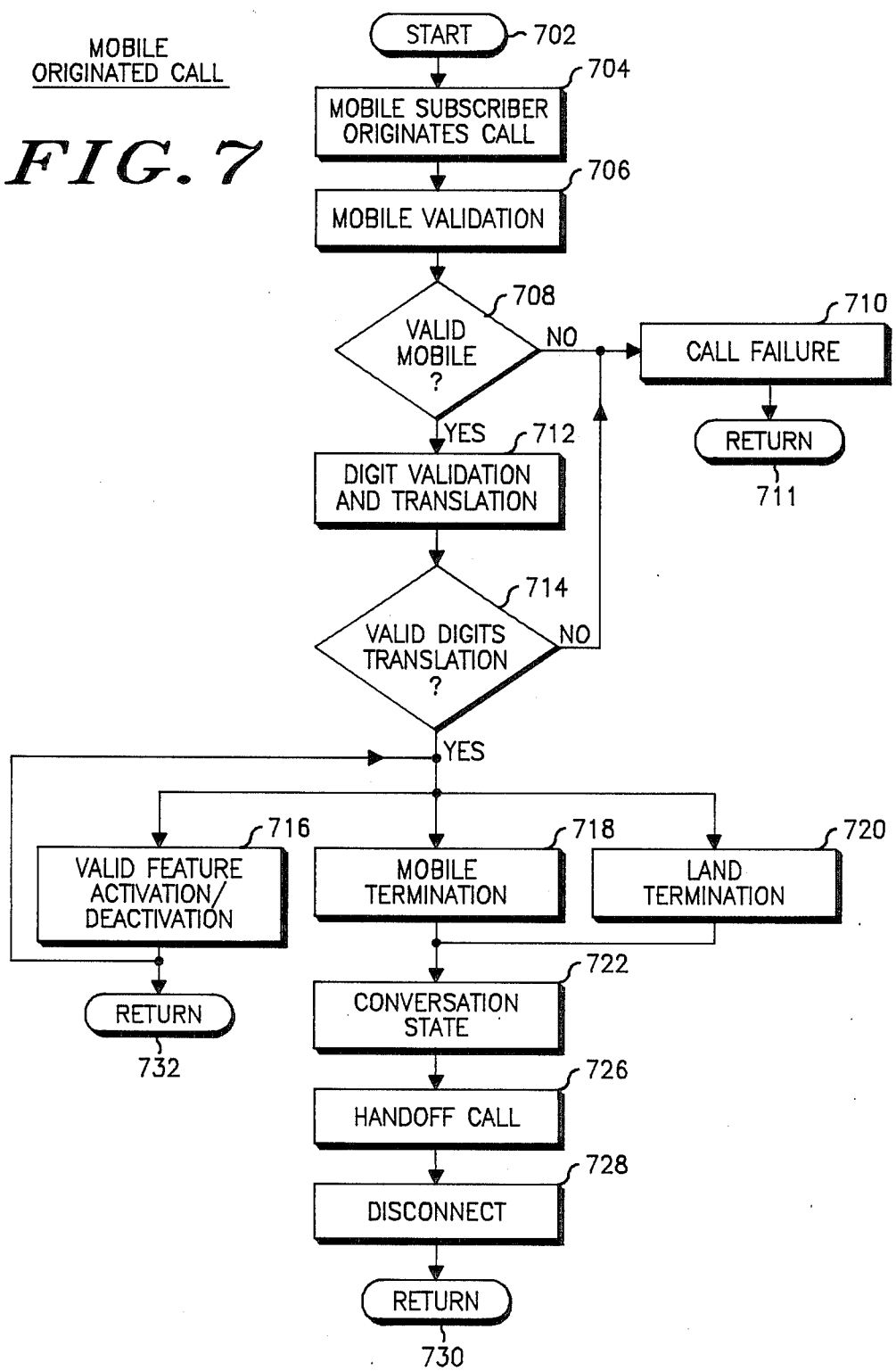
FIG. 7 MOBILE ORIGINATED CALL

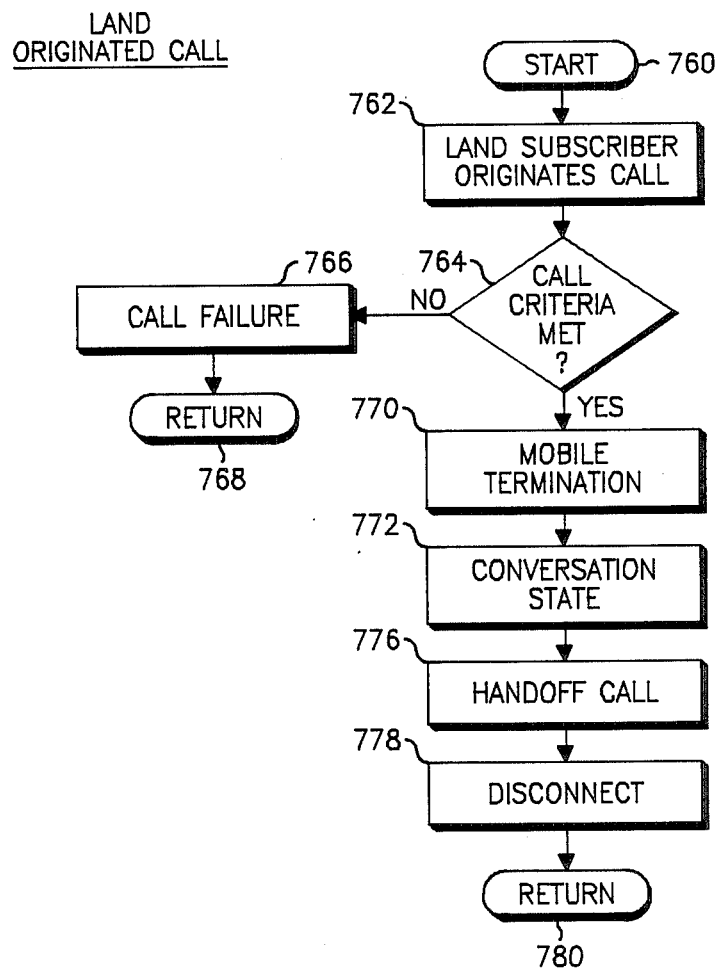

1300 OVERHEAD MESSAGE TRAIN
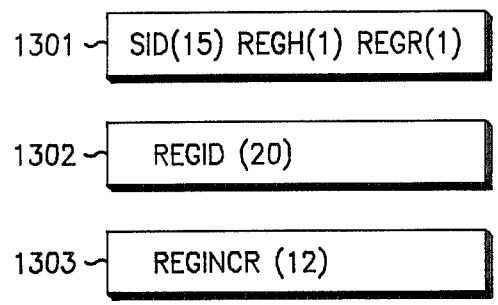
FIG. 11
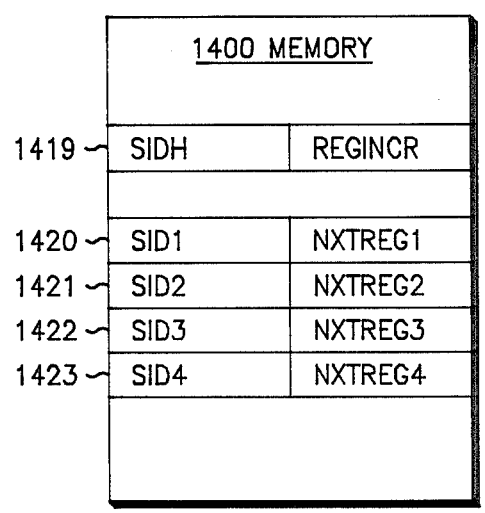
FIG. 12
FIG. 13
1500 DIRECTED RETRY MESSAGE
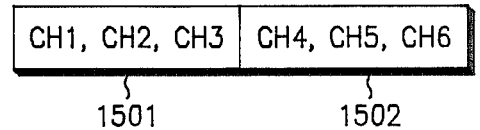

REGISTRATION OF RADIOTELEPHONES IN NETWORKED CELLULAR RADIOTELEPHONE SYSTEMS

CROSS REFERENCE TO RELATED APPLICATION

This is a continuation of application Ser. No. 037,268, filed Apr. 10, 1987, now abandoned, which is a continuation-in-part of the instant assignee's copending U.S. application Ser. No. 925,427, filed Oct. 31, 1986 now U.S. Pat. No. 4,737,978, entitled "Networked Cellular Radiotelephone Systems", invented by Michael Burke et al., and incorporated herein by reference.

BACKGROUND OF THE INVENTION

The present invention generally relates to radiotelephone communication systems and more specifically to a method and apparatus for registration of radiotelephones in networked cellular radiotelephone systems each covering adjacent geographical areas.

Radiotelephone service has been in use for some time and traditionally has been characterized by a central site transmitting by way of high-power transmitters to a limited number of mobile or portable radiotelephones in a large geographic area. To avoid repetition, the word "mobile" and "mobiles" will be used hereinafter to mean mobile or portable radiotelephones. Mobile transmissions, due to their lower power transmitters, were generally received in previous systems by a network of satellite receivers remotely located from the central site for receiving and relaying mobile transmissions to the central site for processing. In previous systems only a limited number of radio channels were available, thus limiting the number of radiotelephone conversations in an entire city to the specific number of available channels.

Modern cellular radiotelephone systems have a comparatively large number of radio channels available which, further, can be effectively multiplied by reuse of the radio channels in a metropolitan area, such as the metropolitan area of a large city like Chicago or New York, by dividing the radio coverage area into smaller coverage areas called cells using low power transmitters and coverage restricted receivers. Such cellular systems are further described in U.S. Pat. Nos. 3,906,166 and 4,268,722. The limited coverage area enables the radio channels used in one cell to be reused in another cell geographically separated according to a predetermined plan, such as a four cell pattern shown and described in U.S. Pat. No. 4,128,740. In this four cell pattern, each cell is assigned a subset of the available radio channels and reuse of the radio channels is accomplished by repeating the pattern throughout a metropolitan area.

A cell system typically utilizes a pair of radio frequencies for each radio channel in each cell. Each cell is assigned at least one paging/access channel and several voice channels. The paging/access channel is dedicated to controlling the operation of the mobiles by means of data messages transmitted to and received from the mobiles. Control functions performed include paging selected mobiles, receiving requests for service from mobiles, instructing mobiles to tune to a voice channel where a conversation may take place, identifying the particular cellular system to the mobiles and enabling mobile registration by which process the mobiles identify themselves to the system. The data message and radio channel specifications for U.S. cellular radiotelephone systems are set forth in Electronic Industries Association (EIA) Interim Standard IS-3-C implemented in accordance with 47 CFR 22 and the Report and Orders pertaining to Federal Communications Commission Docket 79-318. Copies of EIA Interim Standard IS-3-C may be obtained from the Engineering Department of the Electronic Industries Association at 2001 Eye Street, N.W., Washington, D.C. U.S.A. 20006.

Since the cells may be of relatively small size, the likelihood of a mobile travelling out of one cell and into another cell is high. The process of switching the established call from one cell, the source cell, to another, the target cell, is known as handoff. The cellular system determines the need for a handoff by periodically measuring the signal strength of each active mobile. If the measured signal strength is below a predetermined level, the cellular system determines the availability of other channels in neighboring target cells and composes an instruction to the mobile commanding it to tune to an available channel in an acceptable target cell. As more cellular systems are installed, handoffs between different cellular systems may take place in order to maintain a call as the mobile passes from the coverage area of one cellular system to another.

Since mobiles may quickly move between cells and adjacent cellular systems, terminating a call to a particular mobile may necessitate paging that mobile in all cells of the particular cellular system where the mobile is currently located. Mobile location information may be obtained by requiring that each mobile register frequently with its cellular system. However, frequent updating of each mobile's location will divert processing capacity of its cellular system from call processing to registration processing, thereby reducing the number of calls that may be processed and adversely impacting revenues. Accordingly, there is a need for an improved method and apparatus for registration of radiotelephones in networked cellular systems in order to optimize call processng capacity and revenues of the networked cellular systems.

SUMMARY OF THE INVENTION

Therefore, it is an object of the present invention to provide an improved method and apparatus for registration of radiotelephones in networked cellular radiotelephone systems each covering adjacent geographical areas.

Briefly described, the present invention encompasses an improved method of controlling registration of radiotelephones in large and networked cellular radiotelephone systems. Each radiotelephone system has a plurality of cells for providing radiotelephone service to a corresponding geographical area, each cell has paging/access and voice channels and a radio coverage area established by fixed site radios, and each radiotelephone is capable of transmitting a registration message in response to a registration enabling message transmitted on the paging/access channels by the fixed site radios. The unique method comprises the steps of: assigning the same system identification number to each of the radiotelephone systems; establishing the same re-registration parameters for each of the radiotelephone systems such that each radiotelephone registers at least once per day; assigning groups of cells to different paging areas; assigning an offset number to each paging area, different from that assigned to any adjacent paging area, where offset numbers are selected from a predetermined range of numbers; generating a registration identification number for each paging area derived from the corresponding assigned offset number; periodically transmitting on the paging/access channels from the fixed site radios in each cell a registration enabling message containing the corresponding registration identification number for the paging area in which the cell is located; and transmitting a registration message from a radio-telephone when the received registration identification number differs from a previously received registration number by a predetermined amount.

BRIEF DESCRIPTION OF THE DRAWINGS

FIG. 7 is a flow diagram executed by the control terminal in FIG. 2 for processing a mobile originated call in a cellular system networked with at least one other cellular system.

FIG. 8 is a flow diagram executed by the control terminal in FIG. 2 for processing a land originated call in a cellular system networked with at least one other cellular system.

FIG. 11 is a diagram of the overhead message train (OMT).

FIG. 12 is a diagram of a portion of the mobile memory.

FIG. 13 is a diagram of the directed re-try message.

DETAILED DESCRIPTION OF THE PREFERRED EMBODIMENT

Figure 1:
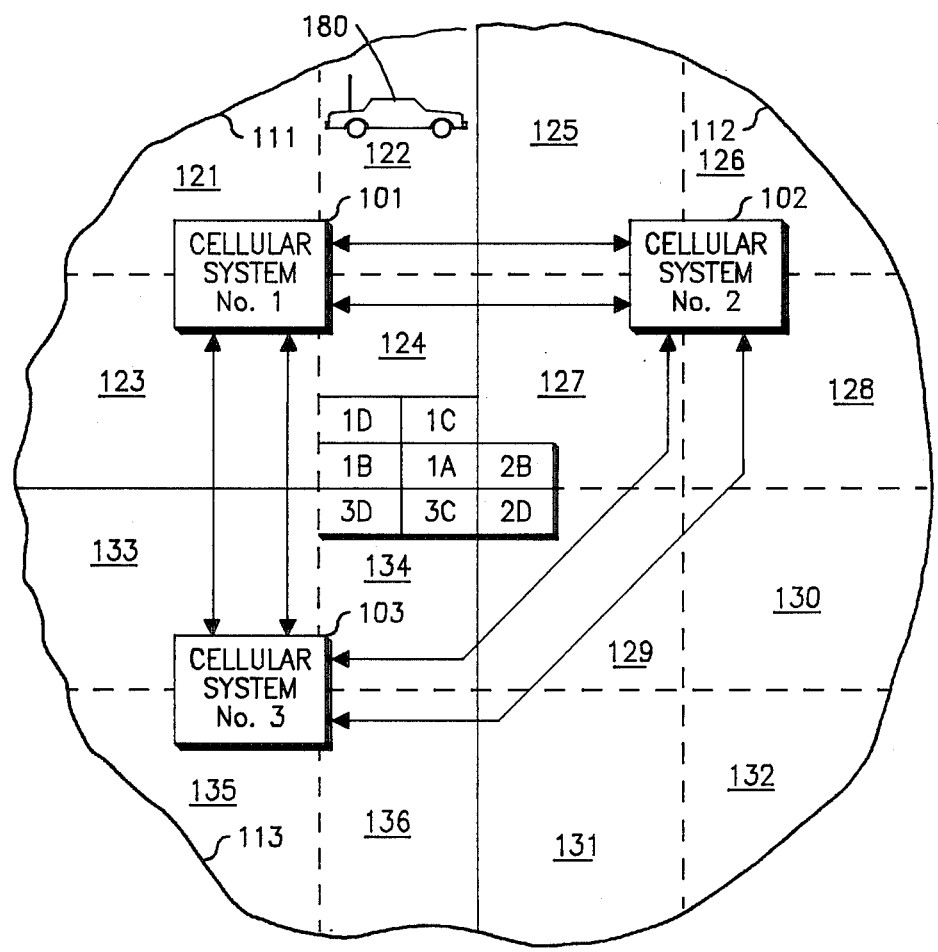
FIG. 1 is a block diagram of three networked cellular systems showing their respective coverage areas, paging areas and illustrative border cells.

In FIG. 1, there is illustrated three networked cellular systems 101-103, each having a corresponding coverage area 111-113, paging areas 121-124, 125-132 and 133-136 and illustrative border cells 1A, 2B and 2D, and 3C, respectively. Cellular systems 101-103 may be owned by one entity or different entities. Each system 101-103 is coupled to the other by a network of data and voice lines for communicating data messages and interconnecting intersystem telephone calls, respectively. This network of data and voice lines may be implemented by dedicated lines or may be routed through the existing landline telephone network. Whenever mobiles, e.g. cellular mobile 180, pass between paging areas, such as, for example, paging areas 122 and 121, mobile 180 must automatically register in the new paging area 122. Mobile 180 also re-registers in paging area 122 if it remains there without making or receiving any calls, for a predetermined time interval since it last registered there. By utilizing the present invention, mobile registrations are minimized, thereby maximizing call processing capacity of the cellular systems 101-103 and the call revenues of the cellular system operators.

According to the present invention, paging of a mobile need not be made throughout the coverage area 111-113 of the networked cellular systems 101-103 in FIG. 1, but instead need only be made to a single paging area 121-136 including a group of cells from one or more of the networked cellular systems 101-103. By using paging areas 121-136, the network of cellular systems 101-103 can continue to grow independently of signalling limitations on the paging/access channel.

A paging area 121-136 consists of a number of contiguous cells, e.g. 1A-1D in paging area 124 and 3C and 3D in paging area 134, chosen such that the number of subscribers expected to be served in the paging area does not exceed that which would produce a predetermined nominal paging rate. The cells comprising a paging area 121-136 may all be connected to a single cellular system or may be distributed among several. Conversely, the cells controlled by a single cellular system 101-103 may all be part of one paging area or may be distributed among more than one. Mobile registration procedures are used to track the movements of every mobile among the paging areas 121-136 while not presenting an undue processing burden on any of the control terminals 420 of each cellular system 101-103. Pages are then "steered" to the cellular system 101-103 controlling the paging area 121-136 where the mobile is located at the time of its most recent registration.

Mobile registration is the process by which a mobile unit becomes listed as being present in the service area of one of the networked cellular systems 101-103 in FIG. 1. In the United States, mobile registration procedures are specified by the provisions of EIA Interim Standard IS-3-C, dated June 1986. Copies of EIA Interim Standard IS-3-C may be obtained from the Engineering Department of the Electronic Industries Association at 2001 Eye Street, N.W., Washington, D.C. U.S.A. 20006.

The purpose of mobile registration is to permit calls to a mobile to be automatically delivered, even though the mobile may be moving from place to place through a cellular system. Mobile registration according to EIA Interim Standard IS-3-C is effected by means of an interaction between a cellular system and the mobiles operating in its service area. This interaction is called "autonomous registration" and is controlled by the cellular system through certain information transmitted to the mobiles in the form of an "overhead message train" (OMT). Referring to FIG. 11, the OMT 1300 is transmitted on paging/access channels throughout the cellular system service area, nominally once each second, and includes a system parameter overhead message 1301 containing SID, REGH and REGR plus, and optionally, several other messages of which the registration ID message 1302, containing REGID, and the registration increment message 1303, containing REGINCR are relevant to the autonomous registration process.

Registration may be enabled or disabled individually for each class of mobile, e.g. home or roam, by means of control bits REGH and REGR in the system parameter overhead message 1301. This message 1301 also contains the identification SID of the serving cellular system from which the mobile determines whether it is a "home" or a "roam" mobile. Each mobile contains, in its internal memory 1400 shown in FIG. 12, an entry 1419 indicating the identity of its home cellular system SIDH and entries 1420–1423 indicating up to four cellular systems (which may include the home cellular system) SID1-SID4 in which it most recently registered successfully, along with a value NXTREG for each cellular system used to determine when it is scheduled to re-register in that cellular system.

Cellular system access for registration purposes may occur only in response to a registration ID message 1302 which may be included periodically in the OMT. The registration ID message 1302 contains a field, REGID, which may be incremented regularly by each base site of cellular systems 101–103. A particular mobile will respond to a specific registration ID message 1302 if both registration is enabled and either the mobile is not currently registered in the system (SID is not one of the four entries in the mobile's internal memory), or the value of the REGID 1302 exceeds the value of the NXTREG variable associated with a SID in the mobile's registration memory 1400, or the value of the REGID 1302 is less than NXTREG-REGINCR-5. Each time a mobile registers in a cellular system it updates the NXTREG value 1419–1423 for that cellular system by adding the last received value of REGINCR 1303 to the last received value of REGID 1302. The mobile also updates NXTREG 1419–1423 for each call origination or page response.

Note that the values of REGID 1302, REGINCR 1303 and NXTREG 1419–1423 are used to control registrations in each cellular system 101–103 individually. In large cellular systems and networked cellular systems 101–103, it is not desirable for mobiles to register frequently, since updating the mobile's service area location in the cellular system's data base can reduce call processing capacity if performed too often. On the other hand, if the interval between registrations is lengthened to avoid burdening the cellular systems 101–103 with unnecessary processing of registration messages, then it is likely that mobiles will become "lost" in the sense that the cellular systems 101–103 don't know in which of the cellular systems of latest registration the mobile is actually located. This means that automatic call delivery for roaming mobiles may not work reliably, or that cellular systems will have their call processing capacity reduced because of the burden of processing frequent registration messages and/or complex searching schemes.

For the foregoing reasons, the mobile registration provisions of EIA Interim Standard IS-3-C are not very well suited to the objective of fully automatic call delivery to mobiles operating in large and/or networked cellular systems 101–103. By utilizing the present invention, each mobile registers automatically only when it moves from one paging area to another, e.g., from paging area 122 to 121. As a result, the registration burden seen by cellular systems 101–103 is held to the absolute minimum level consistent with the fast and accurate tracking of mobile location required for reliable and efficient call delivery.

Careful examination of the re-registration algorithm specified by EIA Interim Standard IS-3-C shows that a mobile will register in a cellular system when the value of the REGID parameter received in a registration ID message 1302 meets either of the following conditions:

$REGID \geqq NXTREG$; or $REGID \leqq (NXTREG - REGINCR - 5)$.

According to the present invention, by causing the value of REGID 1302 being transmitted in each paging area, e.g., 121 in FIG. 1, to be different from that found concurrently in any of the surrounding paging areas 122–136 by an amount at least somewhat greater than REGINCR 1303, and permanently maintaining this offset, then mobiles will register each time they move from one paging area to another. In the preferred embodiment of the present invention, REGINCR, a 12-bit parameter, has a maximum value of 4095, while REGID, a 20-bit parameter, is incremented cyclically from 0 to 1,048,575. If the number 4196, for example, is chosen as the minimum offset in REGID for adjacent paging areas 121–136, then there can be 250 different paging areas 121–136 in the coverage areas 111–113 of cellular systems 101–103 without any two having the same REGID. Accordingly, each paging area 121–136 throughout the coverage areas 111–113 may be assigned an integer number between 0 and 249, called the paging area offset (PAOFF), such that the same value of PAOFF is never used in two paging areas that are near to one another. In the case of the mobiles, only one pair of SID/NXTREG values 1420–1423 is relevant to its registration status in any of the paging areas 121–124, 125–132 and 133–136 since all systems are identified by the same SID.

Figure 2:
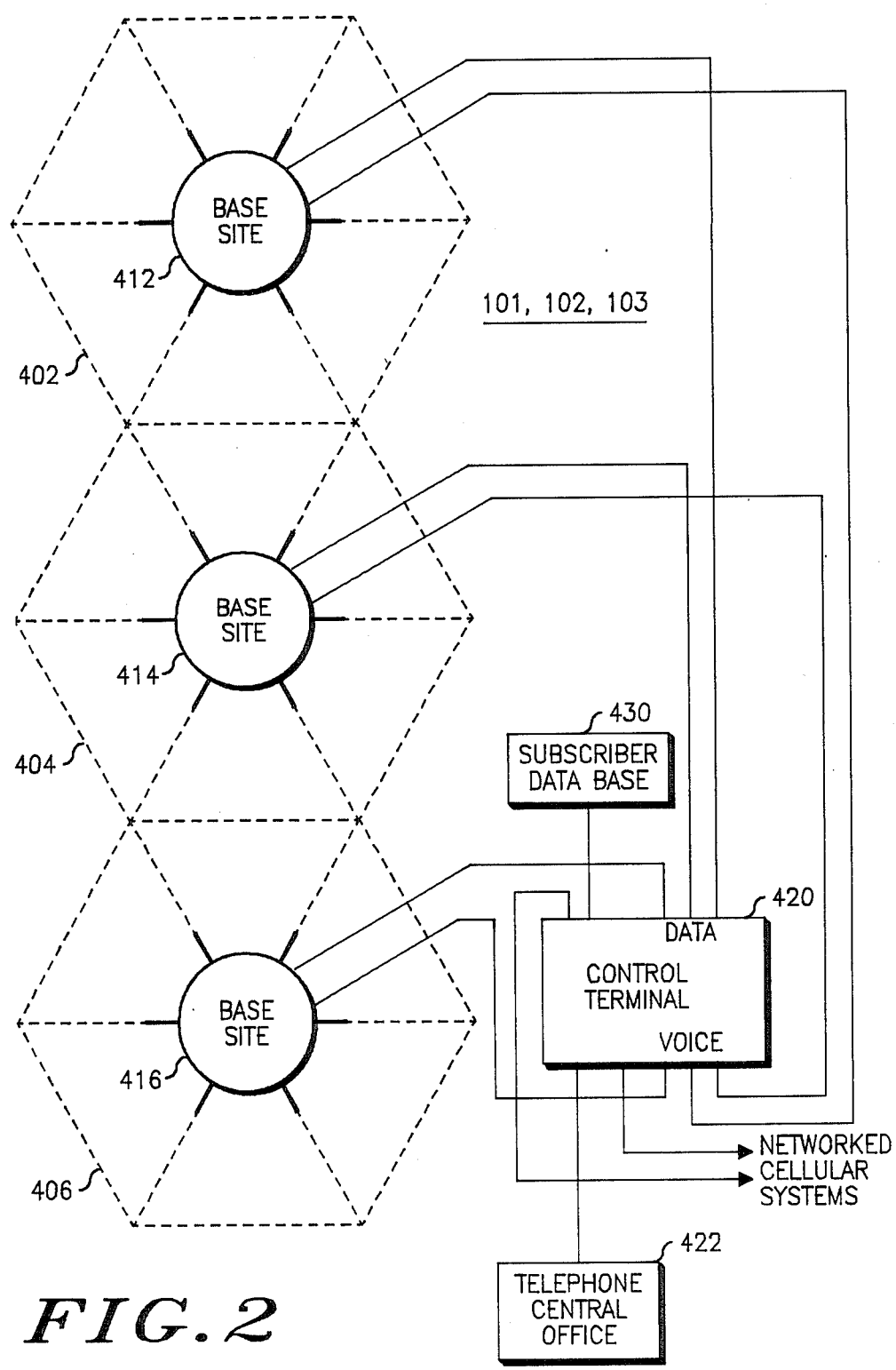
FIG. 2 is a block diagram of the equipment which would be employed in a conventional cellular system having center-illuminated sector cells.
Figure 3:
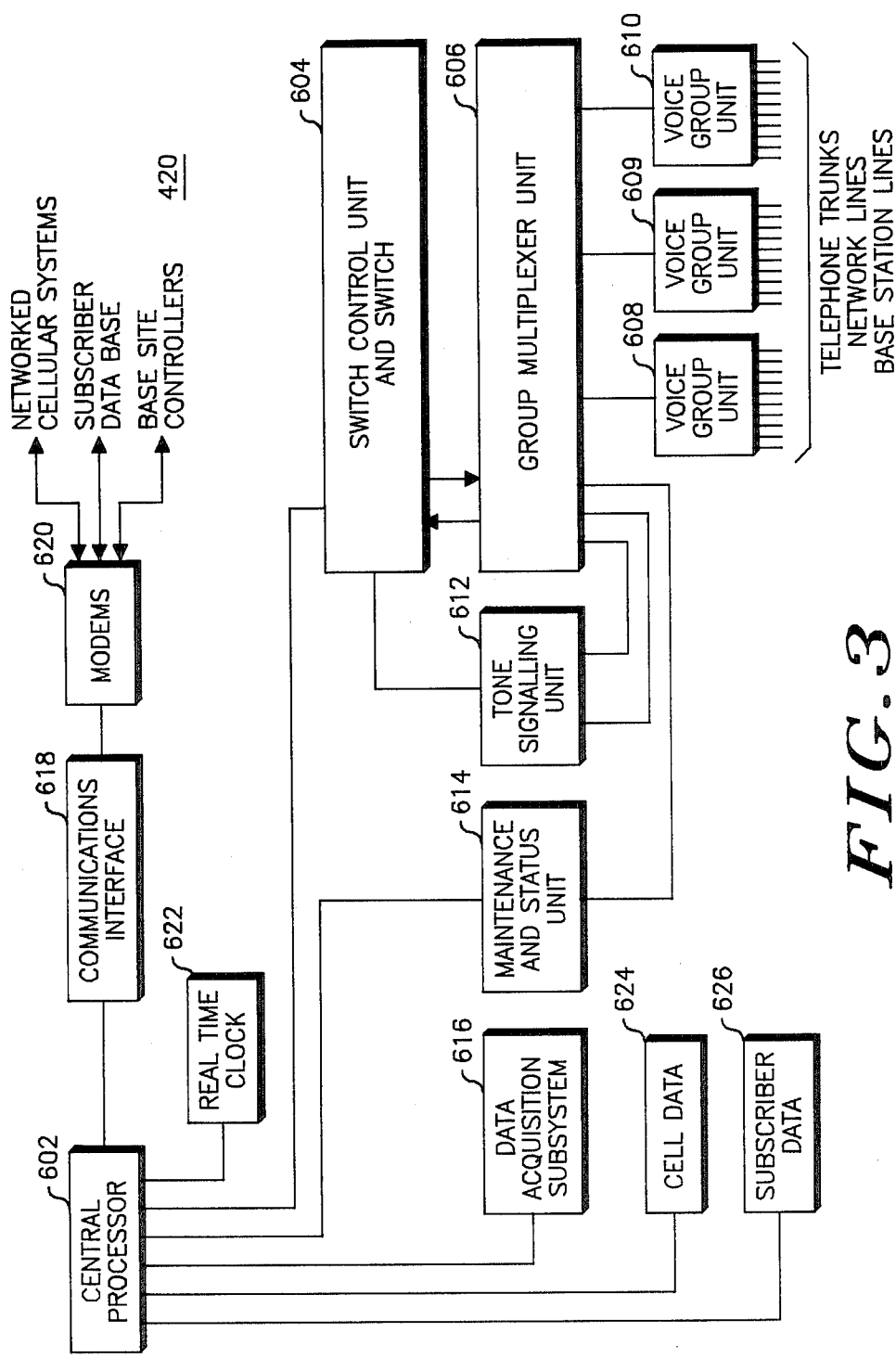
FIG. 3 is a block diagram of the control terminal in FIG. 2.

Each control terminal 420 in FIG. 3 is equipped with a redundant real-time clock 622 that is used for time stamping call records and other system outputs. In the preferred embodiment, the output of the real-time clock 622 has a resolution of one second or less. The 20 bits of the real-time clock 622 output that represents the current time to a resolution of one second is the value of REGID that should currently be transmitted in a paging area with a PAOFF number equal to zero. For other values of PAOFF, this is added to (PAOFF * 4196) to produce the correct REGID. If this result is greater than $(2^{20}-1)$, it must be reduced by $2^{20}$. This value should be computed and down-loaded to the base sites 412, 414 and 416 in FIG. 2 of all cells of the paging areas 121–136 each time the real-time clock 622 is re-set, or when defining new paging areas or re-defining old ones, and at regular but infrequent intervals (such as, for example, once every 24 hours) to compensate for the slow drift of the clocks used at the base sites to time transmission of OMTs. If the real-time clock 622 is re-set due to daylight saving time or other "artificial" reasons, this should also be compensated for when computing each REGID.

REGID messages 1302, which cause mobiles to access the cellular systems 101–103 for registration purposes are transmitted as part of the OMT which has a nominal periodicity of one second. If REGID 1302 is included in every Nth OMT, then a mobile will register within N seconds of acquiring a paging/access channel in a new paging area 121–136. For mobiles which remain indefinitely in a single paging area, e.g. paging area 122, each call origination or page response is treated as being equivalent to a registration. If the interval between registrations is established to be significantly longer than the average time between calls, then mobiles will very rarely access the system solely for registration purposes except when moving between paging areas 121-136. Setting REGINCR to its maximum value of 4095 and the interval at which the REGID value is advanced by one count to, for example, 21 seconds will produce a re-registration interval of:

$$21 * 4095/3600 = 23.89 \text{ hours}$$

which will satisfy the requirement of minimizing registration accesses.

According to EIA Interim Standard IS-3-C, when a mobile's registration access attempt fails (i.e., no confirmation response received by the mobile from the system), it will generate a random number NRANDOM which is uniformly distributed between 1 and 10, and schedule itself to try again by setting NXTREG equal to:

$$NXTREG = REGID + NRANDOM$$

For this reason, cellular systems supporting EIA Interim Standard IS-3-C must advance REGID at periodic intervals or mobiles will occasionally become "lost" until such time as they originate a call or move from one paging area to another.

Figure 5A:
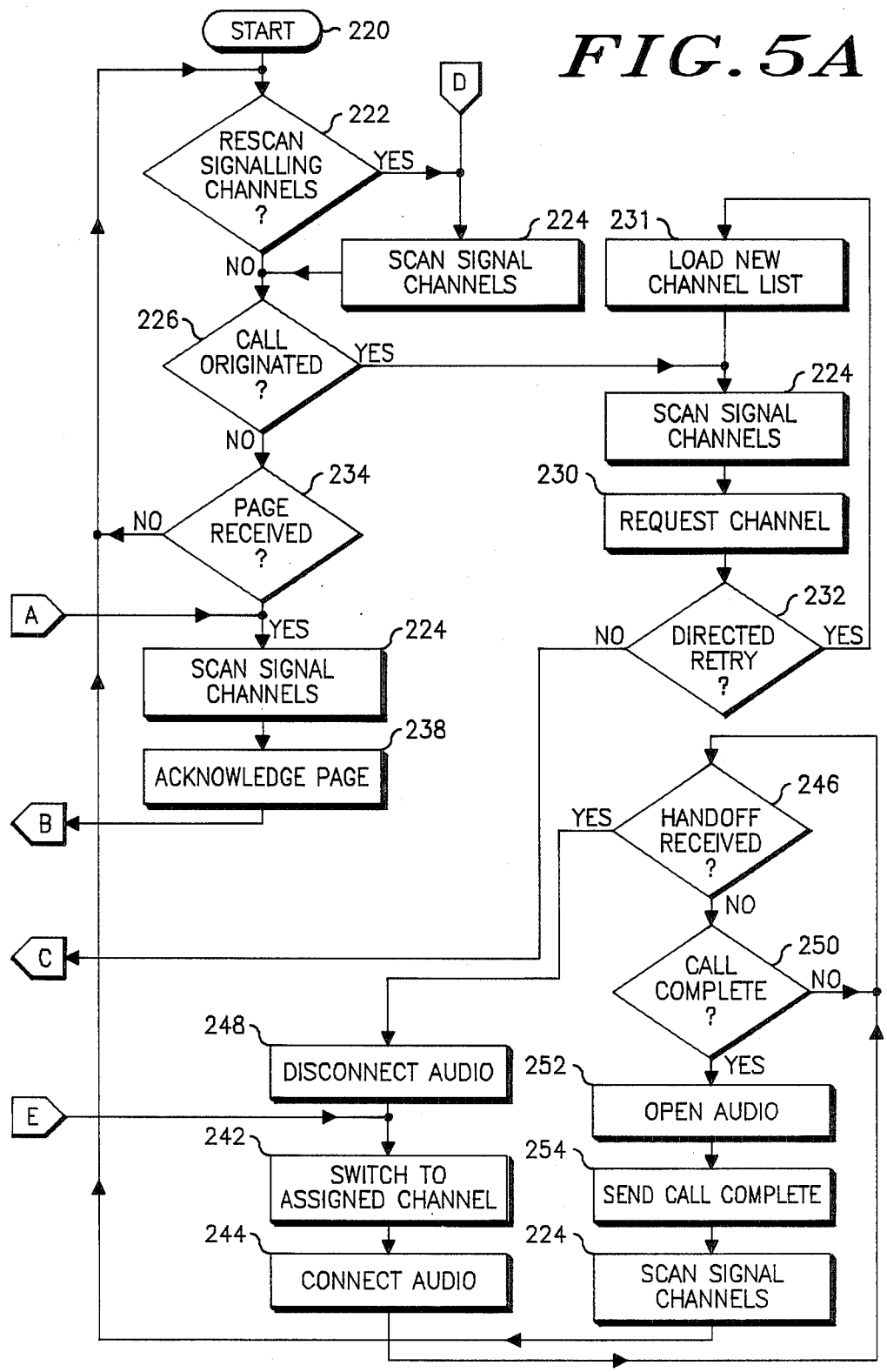
FIGS. 5a-5b are flow diagrams executed by a mobile for receiving or initiating calls in a cellular system networked with at least one other cellular system.
Figure 5B:
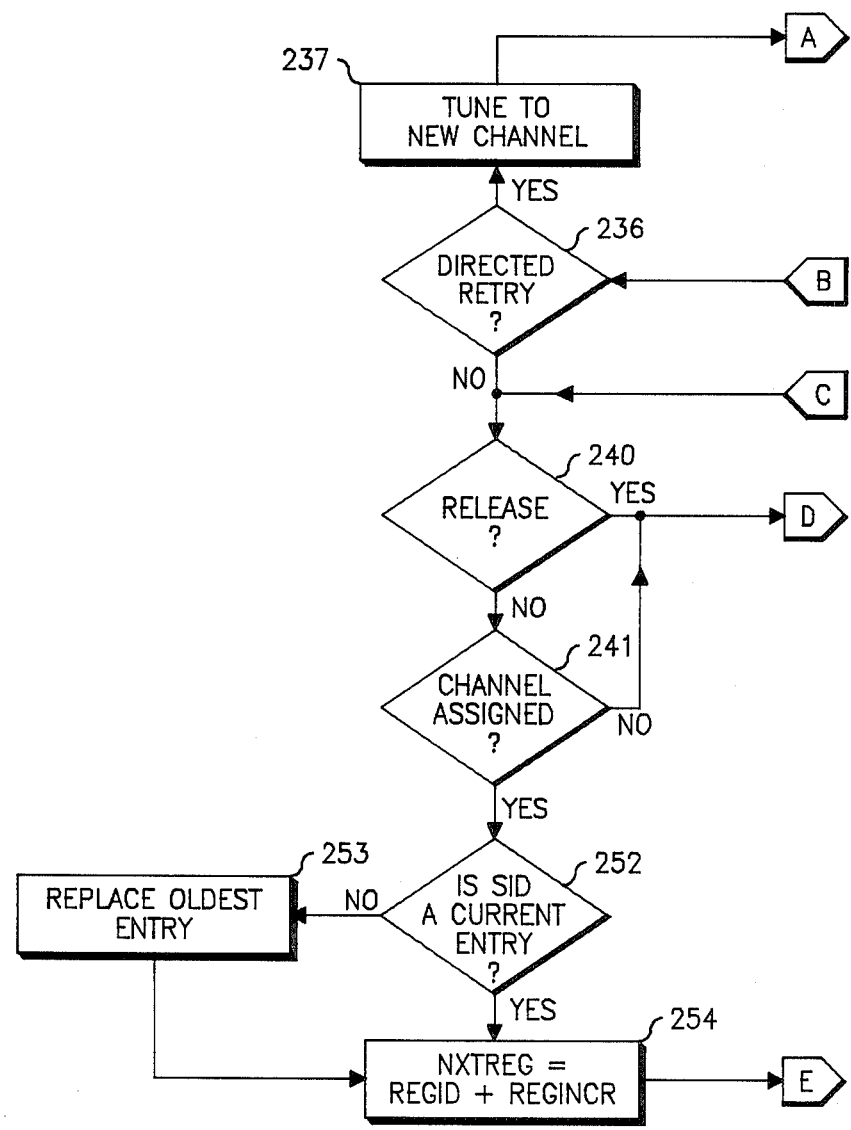

When in the idle mode, a mobile continually monitors one of the paging/access channels in cellular systems 101-103. It selects the particular paging/access channel to monitor by "scanning" a list of such channels designated by the cellular systems 101-103 in the OMT and choosing the strongest (see FIGS. 5 and 6). As illustrated in FIG. 5, a mobile will re-scan the paging/access channels under the following conditions: (1) every five minutes; (2) whenever the signal strength of the present channel becomes so weak that messages cannot be decoded correctly; (3) at the end of every call; and (4) at the beginning of every system access.

When a mobile 180 in FIG. 1 which is operating along the border between adjacent cellular systems 101 and 102 receives a page from paging area 122, it will perform a re-scan according to condition number (4) above. Since mobile 180 is on the border between adjacent cellular systems 101 and 102, the probability is fairly high that the newly selected paging/access channel will be from a paging area 125 of cellular system 102. Cellular system 102 will be unable to process the page response since it did not issue the page and has no knowledge of the call origination. This "abnormal" page response situation will be common in networked cellular systems with multiple paging areas.

According to another feature of the present invention, the directed re-try facility of EIA Interim Standard IS-3-C is used to direct the mobile back to paging cellular system 101. Directed re-try is a message 1500 shown in FIG. 13 which designates up to six alternative access channels from which the mobile may select to re-attempt its system access. Directed retry is presently used when no voice channels are available at a cell site to direct a mobile station, under appropriate signal strength conditions, to a neighboring cell where voice channels may be available. To accommodate the "abnormal" page response situation described above, the directed re-try list for the border cells of each paging area 121-136 must be segmented into two parts 1501 and 1502. The first part 1501 includes access channels of neighboring cells which are part of the same paging area and is used for "normal" page responses, i.e., when the page was sent from the cell responded to, but when no channels are available. The second part 1502 includes access channels of those neighboring border cells that are part of the neighboring cellular system, and is used for "abnormal" page responses to direct the mobile back to a cell in the cellular system that paged it. For example, in the case of paging area 125, the first part 1501 includes access channels of cells in paging area 125 and the second part 1502 includes access channels of cells in paging area 122. The full directed re-try list, specifying access channels for up to six neighboring cells, is used for mobile originations when no voice channels are available.

Referring now to FIG. 2, there is illustrated a block diagram of cellular systems 101-103 in FIG. 1. Such cellular systems 101-103 are further described in U.S. Pat. Nos. 3,906,166 and 4,268,722 each assigned to the assignee of the present invention and incorporated herein by reference and in an experimental cellular radiotelephone system application filed under FCC Docket No. 18262 with the Federal Communications Commission by Motorola and American Radio-Telephone Service, Inc., in Febuary. 1977. Such cellular systems provide telephone coverage to cellular mobiles located throughout a large geographical area. Mobiles may be cellular radiotelephones of the type described in in U.S. Pat. Nos. 4,486,624, 3,962,553 and 3,906,166 each assigned to the assignee of the present invention and incorporated herein by reference, and in Motorola instruction manual No. 68P81039E25, published by Motorola Service Publications, Schaumburg, Ill., in 1979. Mobiles are commercially available in the U.S. from a number of cellular radiotelephone suppliers. Although FIG. 2 shows three center-illuminated sector cells, it is obvious that a person skilled in the art may be able to apply the essence of the present invention to other types of cellular configurations such as, for example, omnidirectional-illuminated or corner-illuminated cellular configurations.

As illustrated in FIG. 2, the geographical area is subdivided into cells 402, 404, and 406 which are illuminated with radio frequency energy from base sites 412, 414 and 416. Each base site 412, 414 and 416 is coupled by data and voice lines to a radiotelephone control terminal 420 which may be similar to the terminals described in aforementioned U.S. Pat. Nos. 3,906,166 and 4,268,722. These data and voice lines may be provided by dedicated wire lines, pulse code modulated carrier lines, microwave radio channels, or other suitable communication links. Control terminal 420 is, in turn, coupled to the existing telephone network via a conventional telephone central office 422 for completing telephone calls between mobiles and landline telephones.

A functional block diagram of a typical control terminal 420 is shown in FIG. 3. This control terminal may be an EMX 100 available from Motorola, Inc. or any other suitable commercially available equivalent. Basically, the control terminal consists of a central processor 602, a switch control unit and switch 604, group multiplexer unit 606, voice group units 608-610, tone signalling unit 612, maintenance and status unit 614, data acquisition subsystem 616, communications interface 618, modems 620, real-time clock 622, cell data base 624 and subscriber data base 626. Cell data base 624 includes data identifying border cells, adjacent cells and lists of paging/access channels for directed retrys. Subscriber data base 626 includes data identifying valid subscriber identification numbers and other subscriber related information. Communications over the data lines to each base site, networked cellular system and remote subscriber data base may be accomplished via conventional modems 620, and any conventional communications protocol such as Advanced Data Communications Control Procedures (ADCCP).

Figure 4:
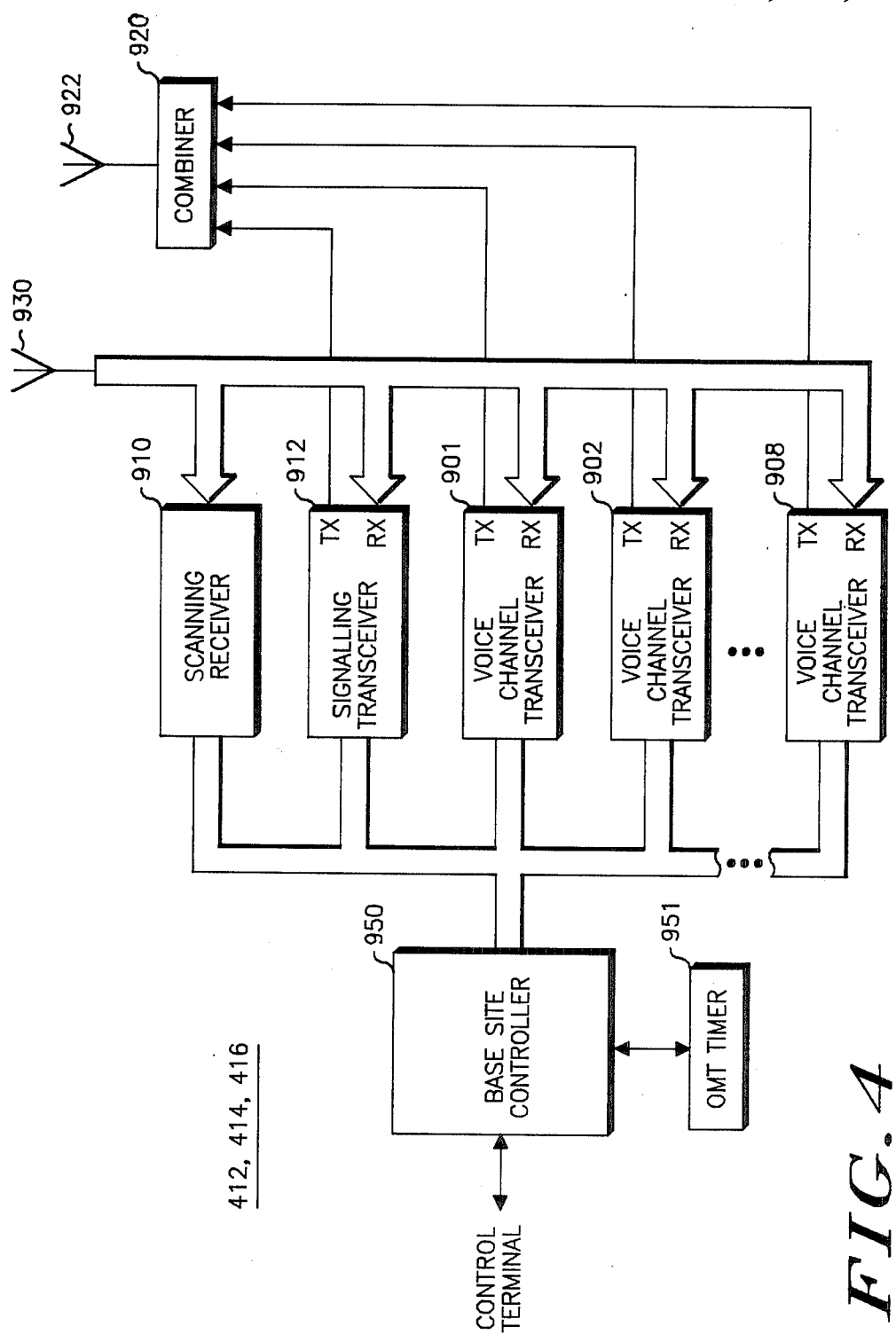
FIG. 4 is a block diagram of the base sites in FIG. 2.

The interconnection between control terminal 420 and the base sites 402, 404 and 406 is further shown in FIG. 4. The interconnection may be on a line per channel basis or a pulse-code-modulation (PCM) group basis. Either type of interconnection is well known in the art. A separate data line, such as, for example, a standard telephone line or other communications link capable of carrying high-speed data, is extended between the control terminal 420 and each base site 402, 404 and 406.

Referring to FIG. 4, each of the base site 412, 414, and 416 includes a base site controller (BSC) 950, an OMT timer 951, a scanning receiver 910, a signalling transceiver 912 for operating on at least one duplex paging/access channel, a plurality of voice channel transceivers 901-908 for operating on corresponding duplex voice channels, receiving antennas 930 and transmitter combiner 920 and transmitter antenna 922. Voice channel transceivers 901-908 may be located substantially at the center of each of the corresponding cells 402, 404, and 406. The transmitters of signalling transceiver 912 and voice channel transceivers 901-908 may be combined by conventional combiner 920 onto one omni-directional antenna 922, while the signalling receiver 912 and receivers of voice channel transceivers 901-908 and scanning transceiver 910 may be selectively intercoupled to two or more directional or omni-directional antennas 930. Alternatively, in other conventional embodiments, each transmitter of signalling transceiver 912 and voice channel transceivers 901-908 may also be coupled to two or more directional antennas. The base site equipment in FIG. 4 and its operation is described in further detail in the instant assignees copending patent application Ser. No. 829,872, filed Feb. 18, 1986, entitled "Method and Apparatus for Signal Strength Measurement and Antenna Selection in Cellular Radiotelephone Systems", invented by Barry J. Menich et al. and incorporated herein by reference. Furthermore, the base site equipment illustrated in FIG. 4 is commercially available from Motorola, Inc. and employs transceivers of the type described in Motorola Instruction Manual No. 68P81060E30, published by Motorola Service Publications, Schaumburg, Ill., in 1982.

In FIG. 4, antennas 930 may be implemented with six 60° sector antennas. Each sector antenna 930 primarily covers a portion of a cell as shown in dashed lines in FIG. 2 and typically has a coverage area that overlaps the coverage area of adjacent sector antennas. Since the paging/access channel generally requires an omni-directional receiving pattern, the signals received by the six sector antennas 930 may be combined in signalling transceiver 912 by means of a maximal ratio predetection diversity combiner, as illustrated and described in U.S. Pat. Nos. 4,369,520 and 4,519,096 each assigned to the assignee of the present invention and incorporated herein by reference. Furthermore, signalling transceiver 912 may provide coverage of a portion of a cell by selectively combining the signals received by two or more of the sector antennas 930. The sector antennas 930 and associated receiving apparatus may be of the type shown and described in U.S. Pat. Nos. 4,101,836 and 4,317,229 each assigned to the assignee of the present invention and incorporated herein by reference.

Because the voice channel transceivers 901-908 of the preferred embodiment may be selectively programmed to any radio channel, each transceiver 901-908 may be used interchangeably as a scanning receiver, voice channel transceiver, or paging/access channel receiver. This fact allows BSC 950 to be relieved of the task of making and controlling the process of signal strength measurement and supervisory audio tone detection thereby making possible the use of available voice channel transceivers 901-908 as scanning receivers when a handoff measurement request (HOMR1) is received from control terminal 420. The available transceiver 901-908 takes cell site characteristics that are downloaded from BSC 950. The downloaded information is the cell type in which the available transceiver 901-908 is being operated (e.g., omni or sector) and what kind of function it is to perform in the system (e.g., voice channel transceiver, scanning receiver, or paging/access transceiver). Also, the available transceiver 901-908 used for scanning is capable of queueing several handoff measurement requests, executing them, and queueing the results for later processing by BSC 950.

Handoff measurement requests (HOMR1) that come from a source BSC to a target BSC are queued automatically and are run as soon as possible. The only reason that a handoff measurement request (HOMR1) would not run immediately is that it would have to wait for a current handoff request to finish execution. Included within the handoff measurement request (HOMR1) are the source signal strength, an optional signal strength offset, the source voice channel frequency and the source supervisory audio tone frequency. When the handoff measurement is run, target BSC compares the source BSC signal strength plus the optional signal strength offset to its measured signal strength and provides a response (HOMRS) if the measured signal strength is greater than the source BSC signal strength plus the optional signal strength offset. Included within the handoff measurement response (HOMRS) is the signal strength measured by target BSC. Otherwise, target BSC does not respond. The handoff measurement task run by target BSC is described in further detail in the aforementioned patent application Ser. No. 829,872, in the aforementioned patent application Ser. No. 925,427, and in U.S. Pat. No. 4,485,486, all incorporated herein by reference.

Referring to FIG. 5, there is illustrated a flow diagram executed by mobiles for receiving or initiating calls in a networked cellular system. The process in FIG. 5 is entered at START block 220 when the mobile is turned on. At decision block 222, turn on is detected and YES branch is taken to block 224 where the mobile scans a predesignated group of twenty-one paging/access channels.

Figure 6A:
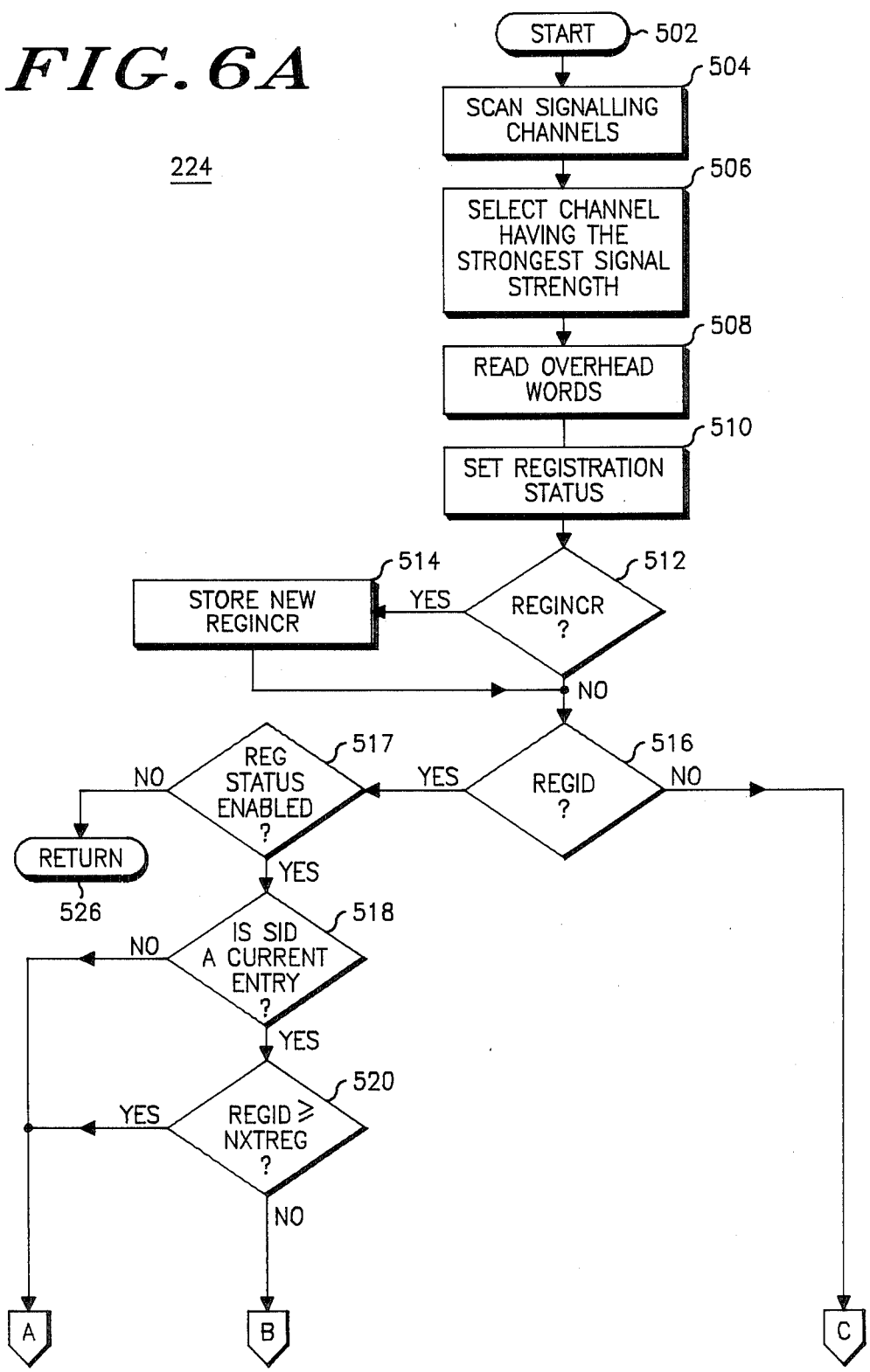
FIGS. 6a-6b are flow diagrams executed by a mobile for scanning the paging/access channels in a cellular system networked with at least one other cellular system.
Figure 6B:
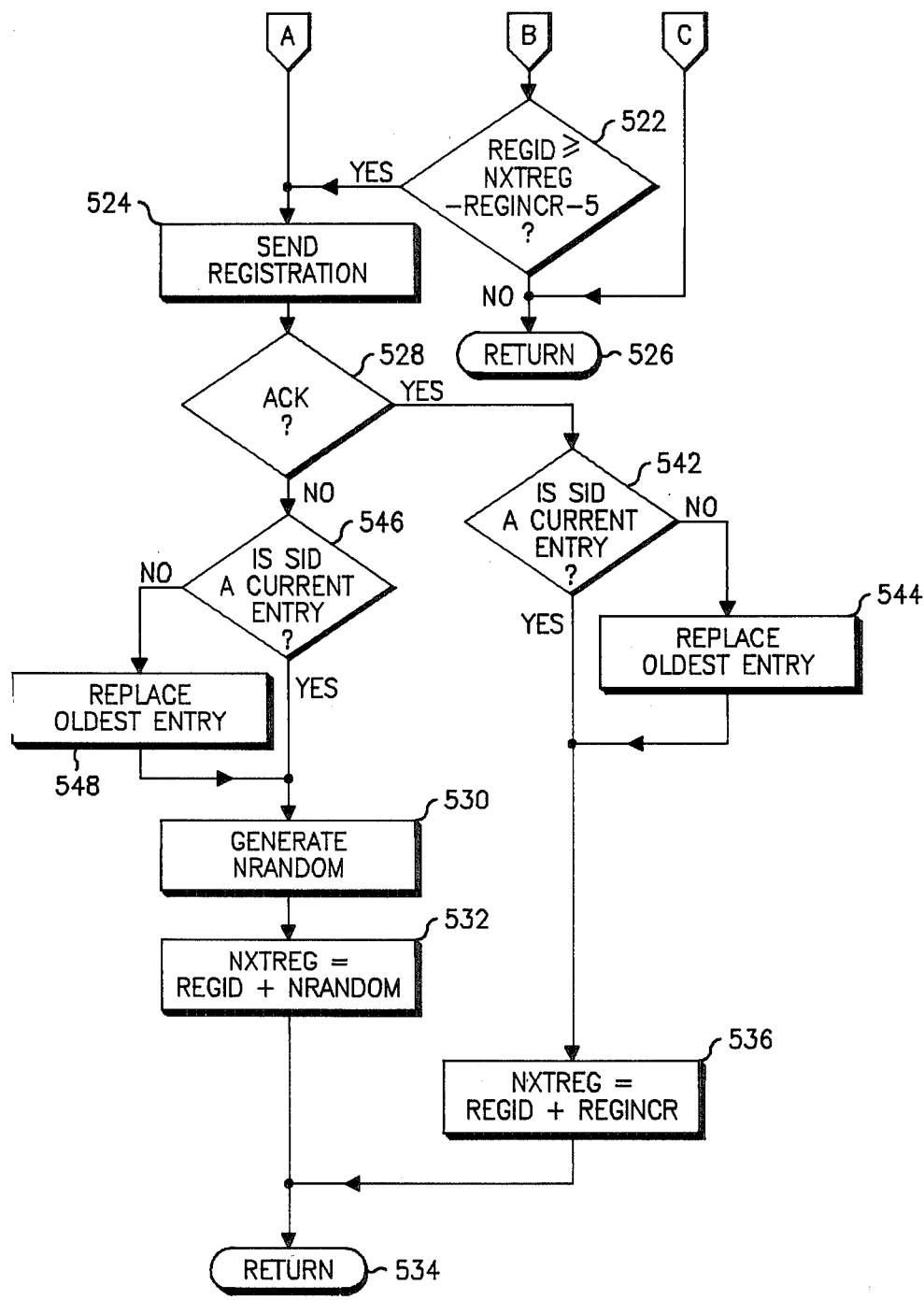

The mobile scanning process is shown in further detail in FIG. 6. Entering at START block 502 and proceding to block 504, a pre-selected group of the twenty-one paging/access channels are scanned. Next, at block 506, the mobile selects the paging/access channel in the pre-selected group which has the strongest signal strength. The mobile then tunes to the selected paging/access channel. At block 508, the mobile reads the overhead words on the selected paging/access channel.

Next, at block 510 in FIG. 6, the registration status is recorded. Then, at decision block 512, a check is made to determine of REGINCR has been received. If so, YES branch is taken to block 514 where the new value of REGINCR is stored in the mobile's memory. Otherwise, NO branch is taken to decision block 516, where a check is made to determine if REGID has been received. If not, NO branch is taken to block 526 to return to the flow diagram of FIG. 5. If REGID has been received, YES branch is taken to decision block 517 to determine if registration status has been enabled. If not, NO branch is taken to block 526 to return to the flow diagram of FIG. 5. If registration status has been enabled, YES branch is taken from decision block 517 to decision block 518 to determine if the received SID is included among the four entries (1420-1423 in FIG. 12) indicating the systems of most recent registration. If the received SID is not so included, NO branch is taken to block 524 to send a registration message.

If received SID is among the current entries in the mobile's memory, YES branch is taken to decision block 520 in FIG. 6 to determine if REGID≧NXTREG. If so, YES branch is taken to block 524 to send a registration message. If not, NO branch is taken from decision block 520 to decision block 522 to determine if REGID≦NXTREG-REGINCR-5. If not, NO branch is taken to block 526 to return to the flow diagram of FIG. 5. If REGID≦NXTREG-REGINCR-5, YES branch is taken from decision block 522 to block 524 where a registration message is sent.

Proceeding from block 524, the mobile checks for an acknowledgement message at decision block 528 indicating that the cellular system received the registration message. If an acknowledgement message has been received, YES branch is taken from decision block 528 to decision block 542 to determine if the SID is among the current entries in the mobile's memory. If not, NO branch is taken to block 544 to replace the oldest entry 1420-1423 with the new SID. If the SID is a current entry, YES branch is taken to block 536 where NXTREG is updated by adding REGINCR to REGID and then stored in the mobile's memory. Thereafter the mobile returns at block 534 to the flow diagram of FIG. 5. If an acknowledgement message is not received, NO branch is taken from decision block 528 to decision block 546 to determine if the SID is among the current entries in the mobile's memory. If not, NO branch is taken to block 548 to replace the oldest entry 1420-1423 with the new SID. If the SID is a current entry, YES branch is taken to block 530 to generate a random number NRANDOM. According to EIA Interim Standard IS-3-C, NRANDOM is a random number between 1 and 10. Then at block 532, NXTREG is updated by adding NRANDOM to REGID and then stored in the mobile's memory. As a result, the mobile will attempt to register again after a relatively short random time interval. Thereafter the mobile returns at block 534 to the flow diagram of FIG. 5.

Returning to decision block 226 in FIG. 5, a check is made to see if a call is being originated by the mobile subscriber. If not, NO branch is taken to decision block 234, where a check is made to determine if a paging message or "page" has been received on the selected paging channel. If not, NO branch is taken back to decision block 222 to determine if it is time to scan the paging and access channels again. Periodically, the mobile will repeat the scan of the paging and access channels to insure that it is monitoring the strongest paging channel. Once a paging channel has been selected, the mobile has selected the cell in which it is operating.

Returning to decision block 234 in FIG. 5, if a page has been received, YES branch is taken to block 224 where the paging/access channels are scanned before acknowledging the page. A page is a data message that informs the mobile that someone is attempting to call the mobile. Then, at block 238, the page is acknowledged on the selected paging/access channel. Next, a check is made at decision block 236 to determine if a directed retry message has been received on the selected paging/access channel. If so, YES branch is taken back to block 237, to tune to the directed access channel. Then, at block 238, the page is acknowledged on the directed access channel.

Returning to decision block 226 in FIG. 5, if a call has been originated, YES branch is taken to block 224 where the paging/access channels are scanned before requesting a voice channel. Then, at block 230, a message is sent on the selected paging/access channel requesting a voice channel assignment. Next, at decision block 232, a check is made to determine if a directed retry message has been received on the selected paging/access channel. If so, YES branch is taken back to block 231, to tune to the directed access channel. Then, at block 230, another message is sent on the directed access channel requesting a voice channel assignment.

Both the call originated path and the page received path join at block 240 where a check is made to see if a release has been received. If so, YES branch is taken to return to block 224. Otherwise, NO branch is taken to decision block 241 to check if a voice channel assignment has been received. If not, NO branch is taken to return to block 224. If a voice channel has been assigned, YES branch is taken to decision block 252 to check to determine if the last received SID is among the current entries in the mobile's memory. If not, NO branch is taken to block 253 where the oldest entry is replaced by the new SID. If the received SID is a current entry, YES branch is taken from decision block 252 to block 254 where NXTREG is updated by adding REGINCR to REGID and then stored in the mobile's memory. Next, at block 242, the mobile tunes its transmitter and receiver to the assigned voice channel and sends a burst of signalling tone (10 Khz) to inform the BSC of its arrival arrival on the voice channel. Audio is connected at block 244 and the call is completed in a similar manner to a conventional landline call.

Next, at decision block 246, a check is made to determine if a handoff has been received. A handoff is a data message informing the mobile to switch to a new voice channel. If a handoff has been received, YES branch is taken to block 248 where the audio path is disconnected. Blocks 242 and 244 are then repeated. When leaving the old voice channel the mobile sends a burst of signalling tone to the old BSC. The old (source) BSC detects the burst of signalling tone and sends source clear message (SC) to the cellular system control terminal 420. The mobile retunes its transmitter and receiver to the new voice channel and transponds the supervisory audio tone. The new BSC detects the supervisory audio tone from the mobile and sends a handoff complete message (HOC) to the cellular system control terminal 420. If a handoff has not been received, NO branch is taken to decision block 250 where a check is made to determine if the call has been completed. If not, NO branch is taken back to decision block 246. If the call has been completed, YES branch is taken to block 252 where the audio path is disconnected. Then, at block 254, a call complete signal is sent, and at block 224, the paging/access channels are scanned before returning to decision block 222.

Referring to FIGS. 7 and 8, there are depicted the typical call flow scenarios which occur in control terminal 420 of each networked cellular system in FIG. 2. Control terminal 420 executes the call processing flow diagram in FIG. 7 for mobile originations and the call processing flow diagram in FIG. 8 for land originations. The flow diagrams of FIGS. 7 and 8, together with related flow diagrams, are also shown and described in Motorola Instruction Manual No. 68P81150E06, entitled "DYNATAC Call Flow", published by Motorola Service Publications, 1301 East Algonquin Road, Schaumburg, Ill. in 1983.

Referring to FIG. 7, the call flow diagram for mobile originations is entered at block 702 and proceeds to block 704 where it is determined that a mobile has originated a call. Control terminal 420 receives the mobile identification number and the telephone number of the called party from the base site selected by the mobile. Next, at block 706, it is determined whether the mobile is a valid local mobile or a valid roaming mobile by accessing the subscriber data base 626 and/or the subscriber data base 430. In networked cellular systems, it is possible that the subscriber information for the originating mobile is not contained in the subscriber data base 626 of the control terminal that received the call. If not, the control terminal 420 will send a message to the other control terminals in the network or, if used, to centralized subscriber data base 430 to determine if the mobile is a valid mobile. This information is passed over the intersystem data lines which connect the networked cellular systems (see FIG. 1). At decision block 708, a check is made to determine if the mobile has been validated. If not, NO branch is taken from decision block 708 to block 710 where call flow is diverted to the call failure process. At this point, a recorded announcement or progress tone is sent to the mobile before it is disconnected.

If the mobile has been validated, YES branch is taken from decision block 708 to block 712 where the digits of the telephone number of the called party are validated before they are translated according to the dialing plan. If the telephone number is not valid, NO branch is taken to block 710 where call flow is diverted to the call failure process. If the telephone number is valid, YES branch is taken to blocks 716, 718 and 720 where the mobile call is terminated to a feature valid to the mobile, a called mobile party or a called land party, respectively. Then, at block 722, the conversation state is entered when the called party answers. During conversation, a handoff may be requested by the BSC 950 processing the call. If a handoff is requested at block 726, call flow is diverted to the handoff call flow diagram in FIG. 10. Otherwise, conversation continues until either the mobile party or called party terminates the call at block 728. At block 728, the call is disconnected, and thereafter, control terminal 420 returns at block 730 to processing other tasks.

Referring to FIG. 8, next consider the scenario where someone on the land network is placing a call to a mobile in the networked cellular system in FIG. 2. A telephone central office 422 of the public switch telephone network (PSTN) will seize a trunk to control terminal 420. Once the trunk is seized, the PSTN will send the selected cellular system 101-103 the desired mobile's telephone number. When a trunk to the control terminal 420 is seized, the land originated call flow diagram of FIG. 8 is entered at block 760 and proceeds to block 762 where the digits of the telephone number of the called mobile are checked to determine if the called mobile is a valid subscriber. As explained above for a mobile originated call, the control terminal 420 accesses the subscriber data base 626 and/or the subscriber data base 430 to determine if the called mobile is a valid local mobile or a valid roaming mobile.

Next, at decision block 764, a check is made to determine if the telephone number of the called mobile has been validated. If not, NO branch is taken from decision block 764 to block 766 where call flow is diverted to the call failure process. At this point, a recorded announcement or progress tone is sent to the land party before it is disconnected.

If the mobile has been validated, YES branch is taken from decision block 764 to block 770 where the call is terminated to the called mobile. At this point, the called mobile is paged. If mobile registration information is stored in the subscriber data base 626 or the subscriber data base 430, the called mobile will be paged only in the paging area in which the called mobile is currently registered. In paging the called mobile, each control terminal 420 will signal the BSCs of the indicated paging area that a call is waiting for the mobile. All the BSCs of the indicated paging area will generate and send a paging message on the paging/access channel to the called mobile to inform the mobile that a call awaits.

Upon receiving the page, the mobile will rescan the paging/access channels group to determine which is the strongest as was described hereinabove with respect to FIGS. 5 and 6. This insures that the mobile will signal in on the best available access or paging/access channel. Once the strongest paging/access channel is determined, the mobile acknowledges the paging message by transmitting an acknowledgement message on the paging/access channel. The mobile's acknowledgement message is forwarded by the BSC to the control terminal 420 over the data line connecting the control terminal 420 and the BSC (see FIG. 2). Note that only one BSC will return the mobile's acknowledgement message to the control terminal 420. Therefore, the control terminal 420 knows the cell in which the mobile is located.

Once the mobile has acknowledged the page, the conversation state is entered at block 772. When the mobile answers, the call proceeds as a normal telephone conversation at this point. During conversation, a handoff may be requested by the BSC 950 processing the call. If a handoff is requested at block 776, call flow is diverted to the handoff call flow diagram in the aforementioned patent application Ser. No. 925,427. Otherwise, conversation continues until either the mobile party or land party terminates the call at block 778. At block 778, the call is disconnected, and thereafter, control terminal 420 returns at block 780 to processing other tasks.

Figure 9:
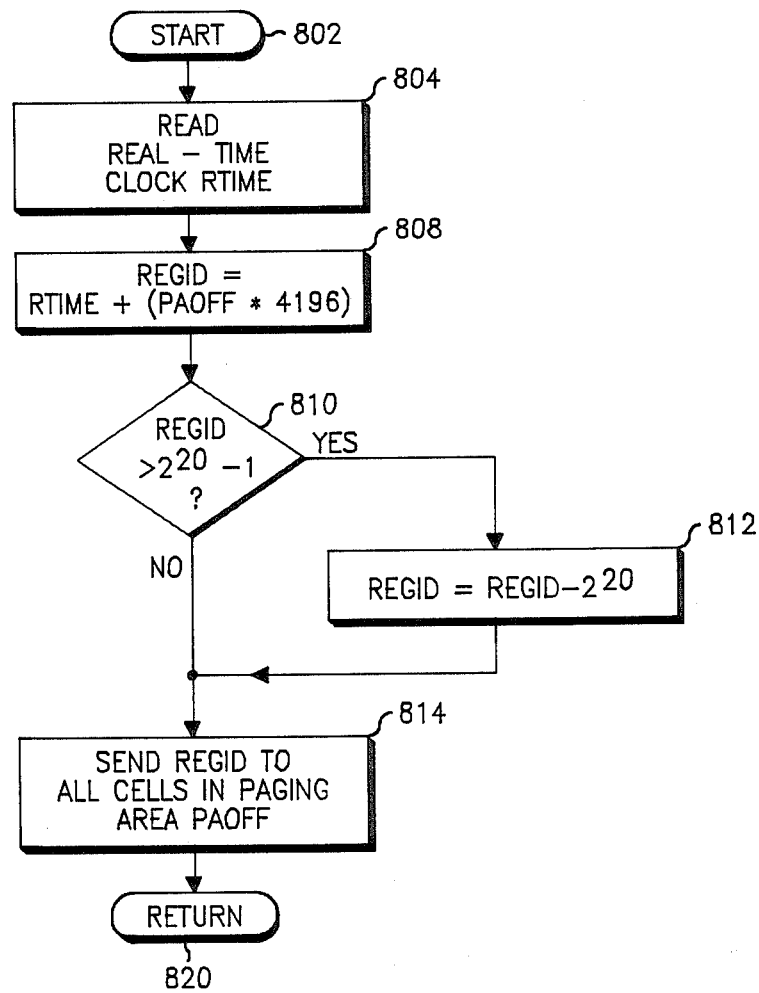
FIG. 9 is a flow chart executed by the control terminal in FIG. 2 for periodically updating registration parameters in each paging area of the cellular system.

Referring to FIG. 9, there is illustrated a flow diagram executed periodically by each control terminal 420 of cellular systems 101-103 in FIG. 2 for updating the REGID parameter in the base sites of each of its paging areas. The registration parameters may be updated once every 24 hours to compensate for any drift in the OMT timers 951 in FIG. 4, or whenever real-time clock 622 in FIG. 3 is re-set. For each paging area, the process in FIG. 9 for updating REGID is repeated once every 24 hours for generating its new REGID.

For a selected paging area PAOFF, the process in FIG. 9 is entered at START block 802 once every 24 hours. PAOFF is an integer number between, for example, 0 and 249. Each paging area 121-136 is assigned the same SID and a different PAOFF. At block 804 the real-time clock RTIME is read. At block 808, REGID is calculated as RTIME+(PAOFF*4196). Next, at decision block 810, a check is made to determine if REGID exceeds $2^{20}-1$, i.e. 1,048,575. If so, YES branch is taken to block 812 where REGID is reduced by $2^{20}$. If not, NO branch is taken to block 814 where the new REGID 1302 is sent to the base sites in all cells of paging area PAOFF. Thereafter, control terminal 420 returns at block 820 to processing other tasks.

REGID is a 20-bit parameter that is incremented cyclically from 0 to 1,048,575. REGID 1302 in FIG. 11 is included by base sites 412, 414, 416 in every Nth OMT 1300. As explained above, in order to produce a re-registration interval of approximately 24 hours, REGID is incremented by one every 21 seconds. Each base site 412, 414, 416 in FIG. 4 includes an OMT timer 951 for this purpose.

Figure 10A:
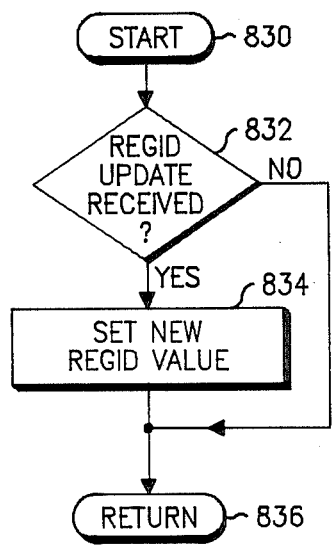
FIGS. 10A and 10B are a flow charts executed by each base site in FIG. 2 for periodically updating registration parameters.
Figure 10B:
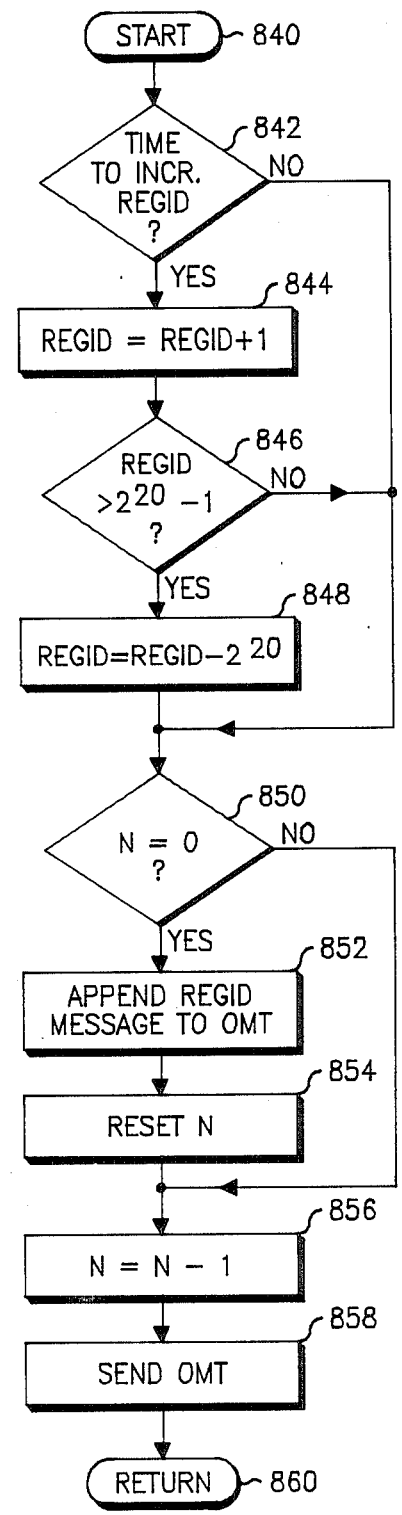

Referring to FIGS. 10A and 10B, there are illustrated flow diagrams executed by each base site 412, 414, 416 of cellular systems 101-103 in FIG. 2 for maintaining REGID at its proper value. During normal operation, the process in FIG. 10A is entered at START block 830 once every second. At block 832, a check is made to determine if a new REGID has been received. IF so, YES branch is taken to block 834 to set the new value of REGID to be included in the OMT. If not, NO branch is taken to block 836 to return to other tasks.

During normal operation, the process in FIG. 10B is entered at START block 840 once every second. At decision block 842, a check is made to determine if it is time to increment REGID. REGID is incremented by one every 21 seconds. If so, YES branch is taken to block 844, where REGID is incremented by one. Next, at decision block 846, a check is made to determine if REGID exceeds $2^{20}-1$, i.e. 1,048,575. If so, YES branch is taken to block 848 where REGID is reduced by $2^{20}$. If not, NO branch is taken to decision block 850 to check if N is zero. IF so, yes branch is taken to block 852 to append the REGID message 1302 to the OMT. Then, at block 856, N is reset to its initial value. Proceeding from block 856 and NO branch of decision block 850 to block 856, N is decremented by one. Next, at block 858, the OMT 1300 is sent, and thereafter the base site returns to other tasks at block 860.

The flow diagrams in FIGS. 5, 6, 7, 8, 9, 10A and 10B provide a detailed description of the process steps executed by the corresponding processing circuitry of the mobile 180 and cellular systems 101-103. By way of analogy to an electrical circuit diagram, these flow diagrams are equivalent to a detailed schematic for an electrical circuit where provision of the circuitry for electrical circuit blocks corresponds to provision of actual computer instructions for the flow diagram blocks. Thus, the coding of the process steps of these flow diagrams into instructions of suitable commercially available computers is a mere mechanical step for a routineer skilled in the programming art.

In summary, an improved method and apparatus for mobile registration in networked cellular systems has been illustrated and described which utilizes unique processes for automatic mobile registration throughout the network. Mobile registration automatically takes place when a mobile moves from one paging area to another. Therefore, while a particular embodiment of the present invention has been shown and described, it should be understood that the present invention is not limited thereto since modifications unrelated to the true spirit and scope of the present invention may be made by those skilled in the art. It is therefore contemplated that the claims of present invention cover any and all such modifications.

I claim:

1. A method of registration for radiotelephones located in one of at least two radiotelephone systems, each radiotelephone system having a plurality of cells for providing radiotelephone service to a corresponding geographical area, each cell having paging/access and voice channels and a radio coverage area established by fixed site radios, and each radiotelephone transmitting a registration message in response to a registration enabling message transmitted on the paging/access channels by the fixed site radios, said method comprising the steps of:
   assigning the same system identification number to each of the at least two radiotelephone systems;
   establishing the same re-registration parameters for each of the at least two radiotelephone systems such that each radiotelephone registers at least once per day;
   assigning groups of cells to different paging areas;
   assigning an offset number to each paging area, different from that assigned to any adjacent paging area, where offset numbers are selected from a predetermined range of numbers;
   generating a registration identification number for each paging area derived from the corresponding assigned offset number;
   periodically transmitting on the paging/access channels by the fixed site radios in each cell a registration enabling message containing the corresponding registration identification number for the paging area in which the cell is located; and
   transmitting a registration message from a radiotelephone when the received registration identification number differs from a previously received registration number by a predetermined amount.

2. The method according to claim 1, further including the steps of receiving registration messages from the radiotelephones, and transmitting a paging message to a radiotelephone on the paging/access channels by the fixed site radios in the paging area in which a registration messages was last received from the radiotelephone.

3. The method according to claim 1, further including the step of storing in each radiotelephone a value with a predetermined relationship to a previously received registration identification number and transmitting a registration message from the radiotelephone when the received registration identification number is greater than or equal to the stored value or is less than the stored value by a predetermined amount.

4. A method of paging radiotelephones located in one of at least two radiotelephone systems, each radiotelephone system having a plurality of cells for providing radiotelephone service to a corresponding geographical area, each cell having paging/access and voice channels and a radio coverage area established by fixed site radios, and each radiotelephone transmitting a registration message in response to a registration enabling message transmitted by the fixed site radios, said method comprising the steps of:

assigning the same system identification number to each of the at least two radiotelephone systems;

establishing the same re-registration parameters for each of the at least two radiotelephone systems such that each radiotelephone registers at least once per day;

assigning groups of cells to different paging areas;

transmitting a paging message to a radiotelephone on the paging/access channels by the fixed site radios in the paging area in which the radiotelephone last transmitted a registration message;

transmitting an acknowledgement message from a radiotelephone in response to a paging message; and directing a radiotelephone to an adjacent paging area if the radiotelephone transmits an acknowledgement message in a paging area which did not transmit the paging message.

5. A method of registration for cellular radiotelephones located in one of at least two cellular radiotelephone systems, each cellular radiotelephone system having a plurality of cells for providing radiotelephone service to a corresponding geographical area, each cell having paging/access and voice channels and a radio coverage area established by fixed site radios, and each cellular radiotelephone transmitting a registration message in response to a registration enabling message transmitted on the paging/access channels by the fixed site radios, said method comprising the steps of:

assigning the same system identification number to each of the least two cellular radiotelephone systems;

establishing the same re-regsstration parameters for each of the least two cellular radiotelephone systems such that each cellular radiotelephone registers at least once per day;

assigning groups of cells to different paging areas;

assigning an offset number to each paging area, different from that assigned to any adjacent paging area, where offset numbers are selected from a predetermined range of numbers;

generating a registration identification number for each paging area derived from the corresponding assigned offset number;

periodically transmitting on the paging/access channels by the fixed site radios in each cell a registration enabling message containing the corresponding registration identification number for the paging area in which the cell is located; and transmitting a registration message from a cellular radiotelephone when the received registration identification number differs from a previously received registration number by a predetermined amount.

6. The method according to claim 5, further including the steps of receiving registration messages from the cellular radiotelephones, and transmitting a paging message to a cellular radiotelephone on the paging/access channels by the fixed site radios in the paging area in which a registration message was last received from the cellular radiotelephone.

7. The method according to claim 5, further including the step of storing in each cellular radiotelephone a value with a predetermined relationship to a previously received registration identification number and transmitting a registration message from the cellular radiotelephone when the received registration identification number is greater than or equal to the stored value or is less than the stored value by a predetermined amount.

* * * * *